United States Patent
Risher

(10) Patent No.: US 7,113,332 B1
(45) Date of Patent: *Sep. 26, 2006

(54) TENSIONED PROJECTION SCREEN APPARATUS

(75) Inventor: Kenneth M. Risher, Warren Park, IN (US)

(73) Assignee: Draper, Inc., Spiceland, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/930,255

(22) Filed: Aug. 31, 2004

Related U.S. Application Data

(63) Continuation of application No. 10/327,421, filed on Dec. 20, 2002, now Pat. No. 6,785,047.

(51) Int. Cl.
*G03B 21/56* (2006.01)
*A47G 5/00* (2006.01)

(52) U.S. Cl. .................................. 359/443; 160/378
(58) Field of Classification Search ............... 359/443, 359/450, 460; 160/373, 374, 378
See application file for complete search history.

(56) References Cited

U.S. PATENT DOCUMENTS

| | | | |
|---|---|---|---|
| 3,485,165 A | 12/1969 | Hughes | 101/127.1 |
| 3,583,466 A * | 6/1971 | Dreyer | 160/351 |
| 3,591,992 A * | 7/1971 | Pawlicki | 52/309.4 |
| 3,655,203 A | 4/1972 | Gretzky | 359/443 |
| 3,875,623 A | 4/1975 | Johnston | 24/580.1 |
| 3,885,335 A | 5/1975 | Egermayer | 40/603 |
| 4,329,716 A | 5/1982 | Porco | 359/450 |
| 4,409,749 A | 10/1983 | Hamu | 30/102.3 |
| 4,580,361 A | 4/1986 | Hillstrom et al. | 359/443 |
| 5,033,216 A | 7/1991 | Gandy et al. | |
| 5,467,546 A | 11/1995 | Kovalak, Jr. | |
| 5,517,779 A | 5/1996 | Coleman | 40/603 |
| 5,818,639 A | 10/1998 | Furuya | 359/455 |
| 6,073,376 A | 6/2000 | Verret | 40/603 |
| 6,084,707 A | 7/2000 | Maruyama et al. | 359/460 |
| 6,191,886 B1 | 2/2001 | Sinkoff | 359/443 |
| 6,249,377 B1 | 6/2001 | Takamoto et al. | 359/461 |
| 6,279,644 B1 | 8/2001 | Wylie | 160/371 |
| 6,318,255 B1 | 11/2001 | Larson | 101/128.4 |
| 6,466,369 B1 | 10/2002 | Maddock | 359/460 |

OTHER PUBLICATIONS

Assembly/Mounting Instructions for "Clarion Permanently Tensioned Projection Screen by Draper"; 4 pages; copyright 2002.
Installation Instructions for "ShadowBox Clarion Projection Screen by Draper"; 1 page; copyright 2002.
Pages 28-30 of Draper, Inc. catalog, copyright 2000.
Installation Instructions for "WrapAround Clarion Screen from Draper"; 2 pages; copyright 2002.
Installation Instructions for "Cineperm Permanently Tensioned Projection Screen by Draper"; 1 page; copyright 2002.
Instruction Book for "Cinema Contour Screen" by Da-Lite Screen Company, Inc.; 2 pages; Oct. 2001.
Installation Instructions for "Permwall Frame"; Da-Lite Screen Company, Inc.; 2 pages; Nov. 2001.
Instruction Book for "Imager"; Da-Lite Screen Company, Inc.; 4 pages; Oct. 2001.

* cited by examiner

*Primary Examiner*—Christopher Mahoney
(74) *Attorney, Agent, or Firm*—Baker & Daniels LLP

(57) ABSTRACT

A projection screen apparatus is disclosed for displaying an image projected by a projector. The projection screen apparatus includes a frame, a screen, and a screen coupler configured to couple the screen to the frame.

40 Claims, 10 Drawing Sheets

TENSIONED PROJECTION SCREEN APPARATUS

BACKGROUND AND SUMMARY OF THE INVENTION

This application is a continuation of U.S. patent application Ser. No. 10/327,421, filed Dec. 20, 2002, now U.S. Pat. No. 6,785,047, the disclosure of which is expressly incorporated by reference herein.

The present invention relates to projection screens. More particularly, the present invention relates to tensioned projection screens.

According to one aspect of the present invention, a projection screen apparatus is provided that includes a perimeter frame, a screen tensioned on the perimeter frame and a screen coupler configured to couple the screen to the perimeter frame. The screen has a substantially flat and blank display portion and a perimeter portion coupled to the display portion and the perimeter frame. The screen coupler includes an end coupled to the perimeter portion of the screen and an interactive member moveable from a first position coupled to the perimeter frame to a second position coupled to the perimeter frame to increase the tension in the display portion of the screen. The end of the coupler is positioned between the interactive member of the coupler and the perimeter portion of the screen.

According to another aspect of the present invention, a projection screen apparatus is provided that includes a perimeter frame, a projection screen having a substantially blank viewable portion tensioned on the perimeter frame and a perimeter portion overlapping a wall of the perimeter frame, and a screen coupler configured to couple the perimeter portion of the screen to the wall of the perimeter frame. The screen coupler includes an interactive member moveable from a first position on the wall of the perimeter frame providing a first amount of tension in the projection screen to a second position on the wall of the perimeter frame providing a second amount of tension in the projection screen that is greater than the first amount of tension in the projection screen.

According to another aspect of the present invention, a projection screen apparatus is provided for use with a projector configured to project an image to be watched by a viewer. The projection screen apparatus includes a perimeter frame, a projection screen including a substantially blank front display surface positioned to face toward a viewer of a projected image, and a coupler. The display surface defines a plane having a first display side and a second side opposite the first side. The coupler is positioned on the first display side of the plane to couple the projection screen to the perimeter frame. The coupler includes an interactive member configured to couple with the perimeter frame. The interactive member of the coupler is movable from a first position coupled to the perimeter frame to a second position coupled to the perimeter frame to increase the tension in the screen.

According to another aspect of the present invention, a projection screen apparatus is provided that includes a screen and a perimeter frame coupled to the screen. The perimeter frame includes a plurality of corner members and a plurality of frame members. The plurality of corner members has a width and the plurality of frame members is substantially the same width as the corner members. The plurality of frame members extends between at least two of the plurality of corner members. The plurality of frame members and plurality of corner members cooperated to define a junction. The junction includes at least one aperture and at least one post positionable in the channel.

According to another aspect of the present invention, a projection screen apparatus is provided for use with a projector configured to display an image to be watched by a viewer. The projection screen apparatus includes a screen displaying the image and a perimeter frame coupled to the screen. The perimeter frame includes a plurality of corner members and a plurality of extended frame members. The plurality of corner members defines at least a portion of the perimeter frame. The plurality of extended frame members extends between the plurality of corner members.

According to yet another aspect of the present invention, a projection screen apparatus is provided that includes a perimeter frame, a screen tensioned on the perimeter, and a plurality of screen couplers configured to couple the screen to the perimeter frame. The screen includes an edge portion configured to define a loop. The screen couplers include a first end and a second end. The second end having an open channel, and a rod. The open channel is sized to receive the loop. The rod is removably placed inside the loop and the open channel to retain the loop in the open channel.

Additional features of the present invention will become apparent to those skilled in the art upon consideration of the following detailed description of an illustrated embodiment exemplifying the best mode of carrying out the invention as presently perceived.

BRIEF DESCRIPTION OF THE DRAWINGS

A detailed description particularly refers to the accompanying figures in which.

DETAILED DESCRIPTION OF THE DRAWINGS

Figure 1:
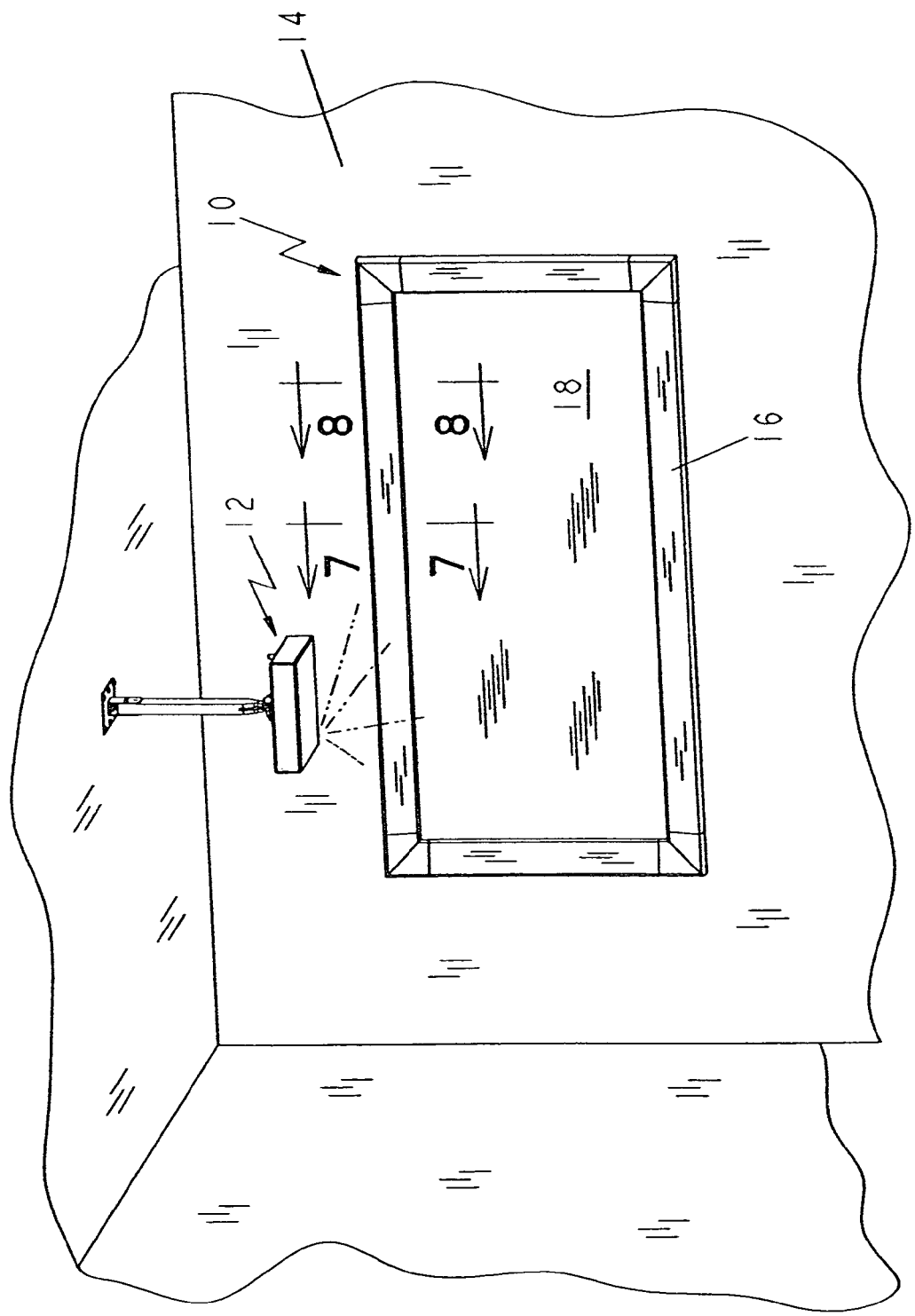
FIG. 1 is a perspective view of a room showing a projector projection an image on a projection screen apparatus according to the present disclosure.

According to the present disclosure, a projection screen apparatus 10 is provided to display images projected by a projector 12. Typically, projection screen apparatus 10 is mounted to a wall 14 of a structure, such as an entertainment room of a residence or conference room of a business. As shown in FIG. 1, projector 12 is positioned on the audience side of projection screen apparatus 10 to reflect back the images projected by projector 12 to an audience. According to alternative installations, projector 12 is positioned for a rear projection application on the back side of projection screen apparatus 10 so that images projected by projector 12 are displayed through projection screen apparatus 10 to the audience. In some installations, speakers (not shown) are positioned behind the projection screen apparatus 10 so that the sound is transmitted through projection screen apparatus 10.

Figure 2:
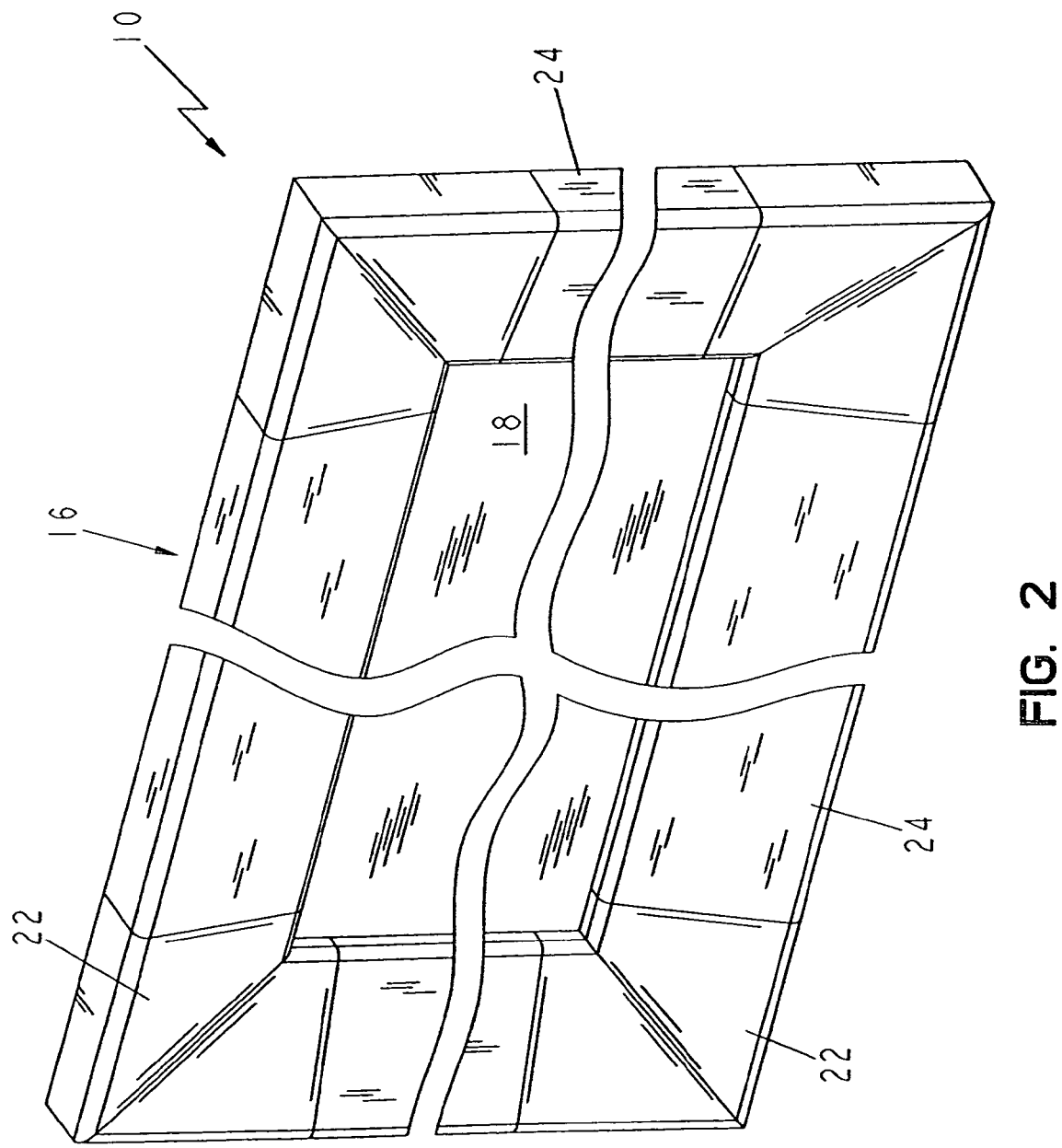
FIG. 2 is a perspective view of four corners of the projection screen apparatus of FIG. 1.
Figure 5:
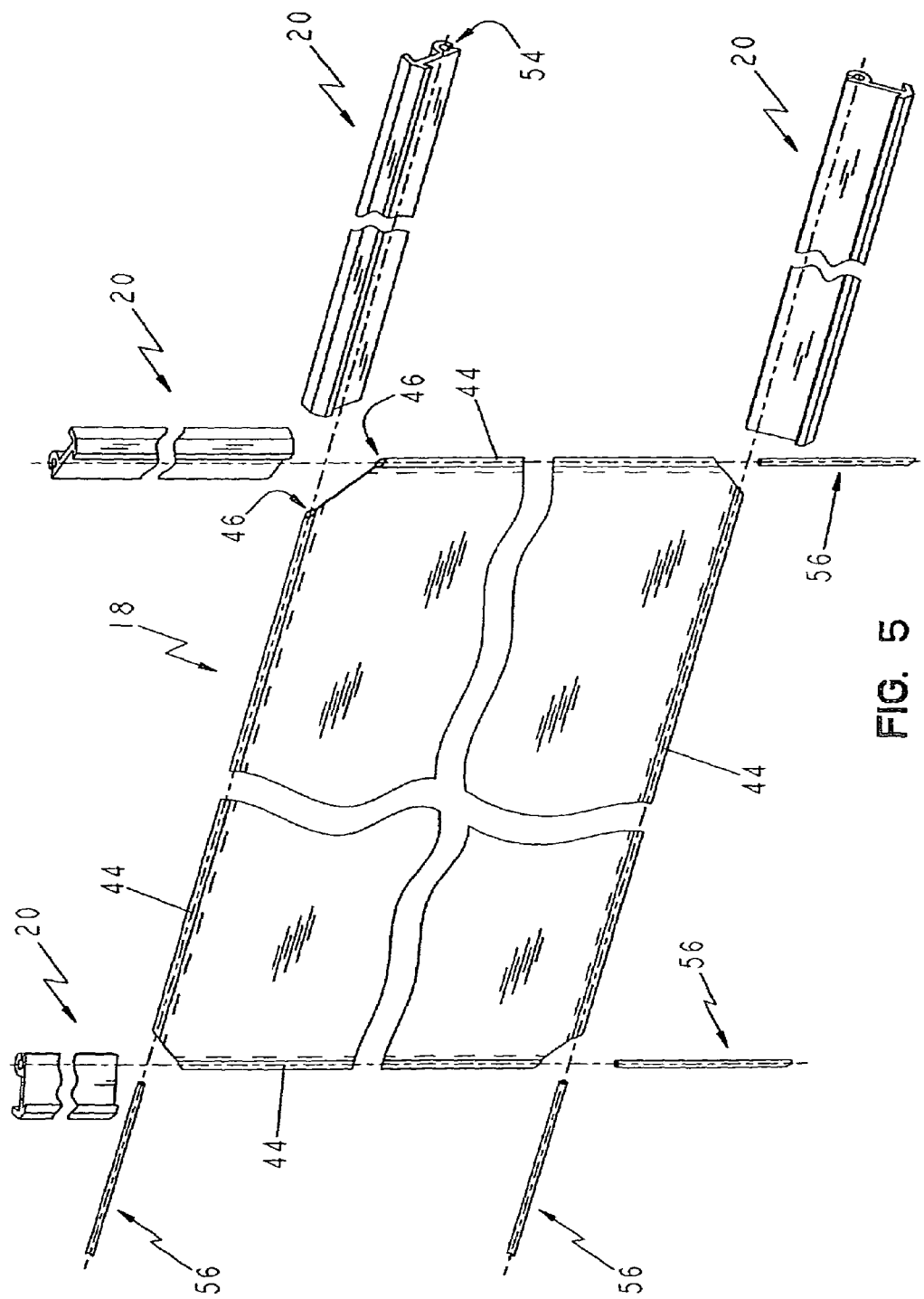
FIG. 5 is an exploded perspective view of a projection screen and four couplers configures to couple the screen to the frame.
Figure 7:
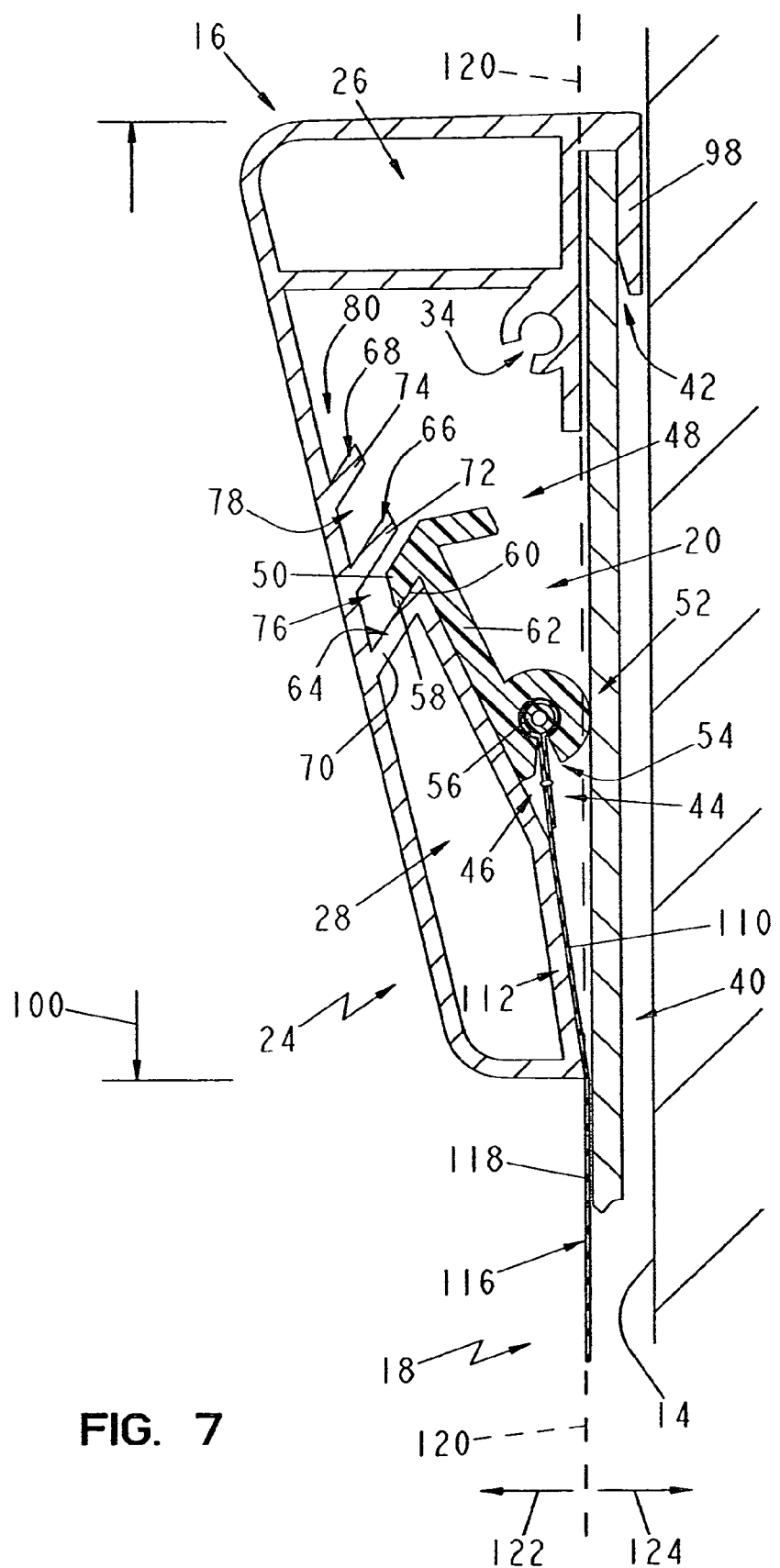
FIG. 7 is a cross-sectional view taken along line 7—7 of FIG. 1 showing the coupler in a first location relative to the frame member.

As shown in FIG. 2, projection screen apparatus 10 includes a perimeter frame 16 and a projection screen 18 tensioned on frame 16. As shown in FIG. 5, projection screen apparatus 10 further includes a plurality of couplers 20 that couple projection screen 18 to frame 16 as shown in FIG. 7. According to the preferred embodiment, each coupler 20 can be positioned at one of a number of locations on frame 16. Depending on the location at which coupler 20 is positioned on frame 16, the level of tension in screen 18 is greater or lesser.

Figure 6:
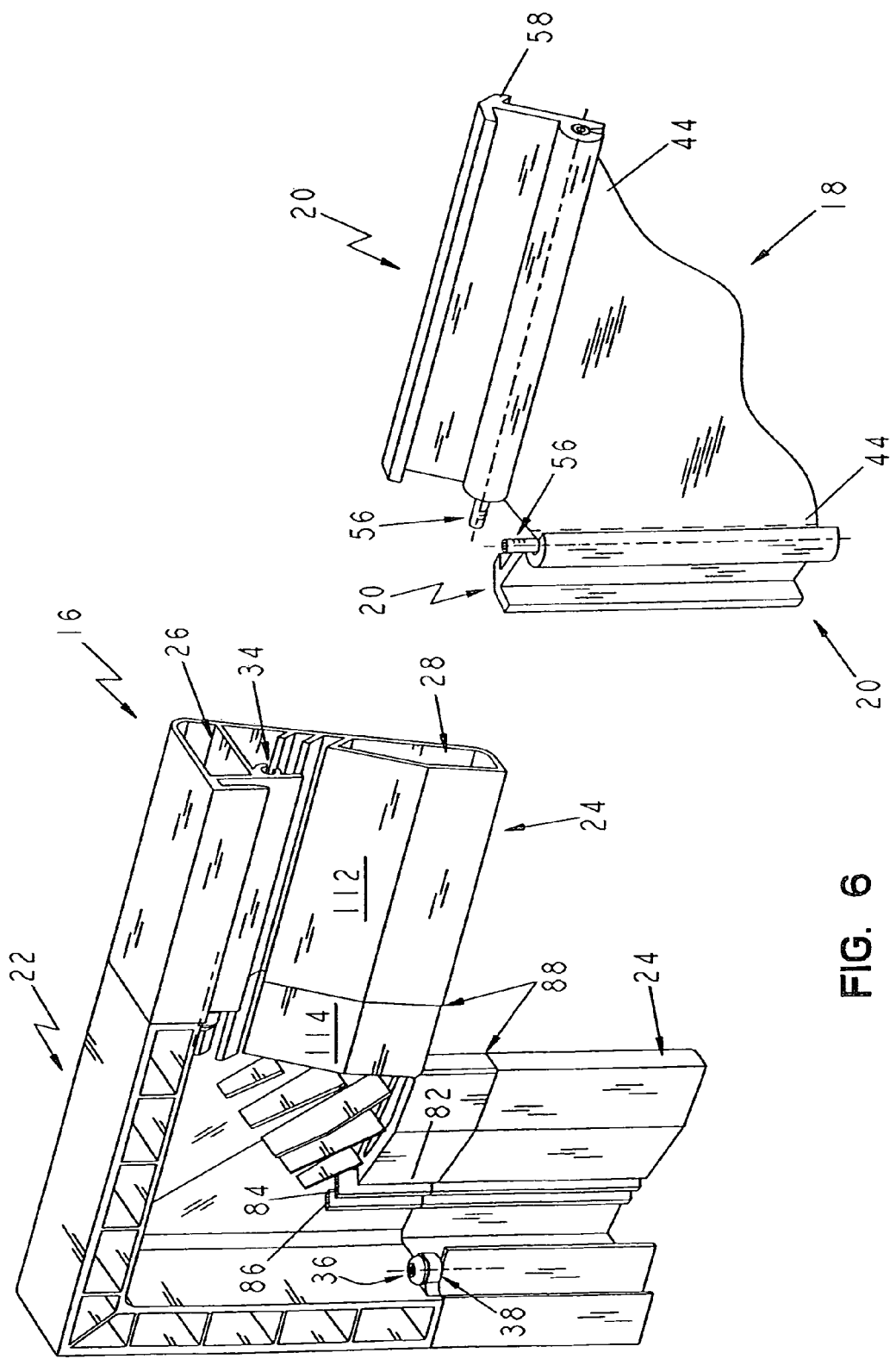
FIG. 6 is a perspective view of a portion of the projection screen apparatus showing two extended frame members coupled to a corner member and the projection screen aligned to be coupled to the frame and corner members by two screen coupler.

Frame 16 includes four corner members 22 and four extended frame members 24 extending between corner members 22 and forming a junction 88, as shown in FIG. 6. Junction 88 includes a pair of channels 26, 28 and a pair of posts 30, 32. Each frame member 24 is made of extruded aluminum and includes the pair of channels 26, 28. The lengths of frame members 24 are dependent upon the size of screen 18.

Each corner member 22 is made of ABS plastic and includes the pair of posts 30, 32 sized to fit within respective channels 26, 28 of respective channels 26, 28 of respective frame members 24. During assembly, posts 30, 32 are slid into respective channels 26, 28 of each respective frame member 24 to define a rectangular perimeter.

Each frame member 24 further includes a fastener-receiving channel 34 sized to receive a fastener 36, such as a screw. Each corner member 22 includes a pair of fastener-receiving apertures 38 also sized to receive fastener 36. After posts 30, 32 are positioned in channels 26, 28, fastener 36 are inserted into apertures 38 and screwed into channels 34 to securely couple corner members 22 to respective frame members 24.

Depending upon the length of frame members 24, an aluminum brace 40 is provided that extends between opposite frame members 24. Each frame member 24 includes an open channel 42 and opposite ends of brace 40 are positioned in channels 42. Preferably, brace 40 is under slight compression. According to alternative embodiments, fasteners are provided to secure brace 40 on frame members 24.

Before or after frame 16 is assembled, couplers 20 are coupled to projection screen 18. Preferably before shipment of projection screen apparatus 10, edges 44 of screen 18 are folded over and sewn as shown in FIG. 5 to define permanent loops 46 in screen 18.

Screen 18 may be made of a number of materials suitable for projection screen applications. Preferably, screen 18 has a reflectivity gain from about 0.4 to about 2.5. Front projections screens are preferably white or light gray in appearance. Rear projection screens are preferably light gray in color and translucent to permit the projected image to transmit through the screen and be displayed to the audience. Some of the screens are acoustically transparent, like speaker cover fabric, to permit sound to be transmitted through the screen.

According to one embodiment, the screen includes a woven fiberglass backing with a vinyl reflective surface laminated to the fiberglass (gain of approximately 1.0). According to one embodiment, microscopic glass beads are provided on the viewing surface (gain from about 0.5 to about 2.5 depending on the viewing angle). According to another embodiment, the screen is made of a white (gain of about 1.0 or from about 0.4 to about 2.2 depending on the viewing angle) or light gray (gain of about 0.6 to 0.9 depending on the viewing angle) vinyl material without a backing. Other suitable projection screens known to those of ordinary skill in the art may also be provided. Preferably the screen is substantially blank so that it is substantially free of printing or other markings that noticeably detract from the images projected on the screen. According to one embodiment, the substantially blank screen is provided with black borders that frame the screen for "wide screen" or other projection formats.

Couplers 20 are made of extruded, rigid PVC and include a first end 48 having an interactive member 50 and a second end 52 having an open channel 54 sized to receive loops 46 of screen 18. Preferably at the site of installation, each loop 46 is positioned to extend down an open channel 54 of a respective coupler 20. A retention rod 56 that is slightly longer than coupler 20 is slid through an open end of each loop 46. This prevents the withdrawal of the respective loop 46 from the respective screen coupler 20 to couple each screen coupler 20 to an edge 44 of screen 18. Preferably, retention rods 56 are hollow and made of HDPE plastic. Because loops 46 are permanent, the position of couplers 20 relative to screen 18 is fixed by the manufacturer and not dependent upon the skill of the installer.

After screen couplers 20 are coupled to screen 18, they are coupled to frame 16 to tension screen 18 on frame 16. Each interactive member 50 of couplers 20 includes a rib 58 that defines an undercut groove 60 with a body 62 of coupler 20. Each frame member 24 includes three spaced-apart interactive members 64, 66, 68 including ribs 70, 72, 74 that define undercut grooves 76, 78, 80. Interactive member 50 of screen coupler 20 mates with one of interactive members 64, 66, 68 to couple coupler 20 to frame member 24. Each corner member 22 includes two sets of corresponding interactive members 82, 84, 86 that align with respective interactive members 64, 66, 68 of adjacent frame members 24 to define continuous interactive members and grooves that extend across junctions 88 defined between respective corner and frame members 22, 24.

Each respective coupler 20, loop 46, and retention rod 56 is longer than the distance between each exposed end of frame member 24 so that each coupler 20, loop 46, and rod 56 extends over the respective junction 88 between corners 22 and frame members 24 when couplers 20 are coupled to frame 16. Thus, continuous coupling is provided along the entire length of frame members 24 and extends over to corners 22.

Figure 3:
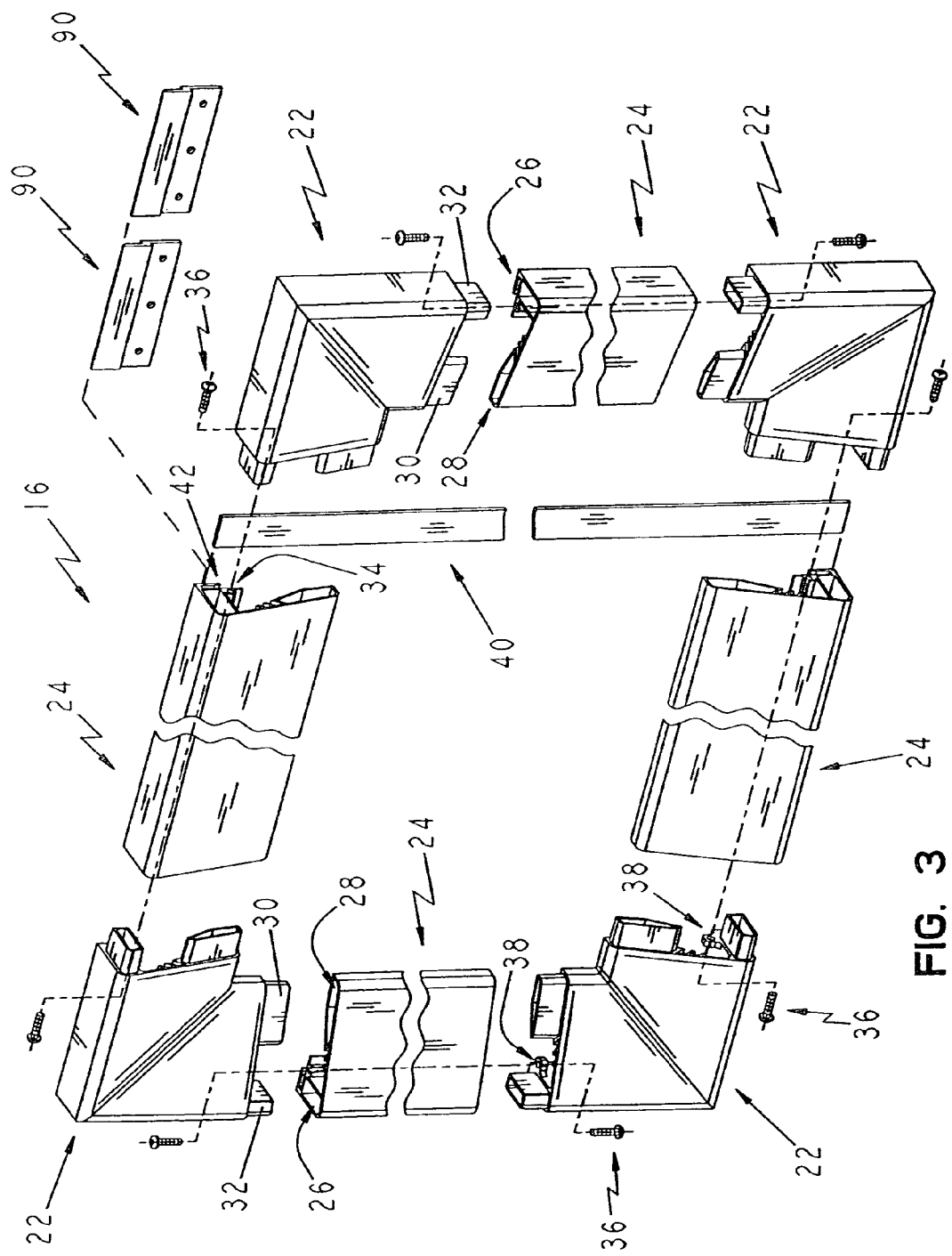
FIG. 3 is an exploded perspective view of a frame of the projection screen apparatus of FIG. 1.
Figure 4:
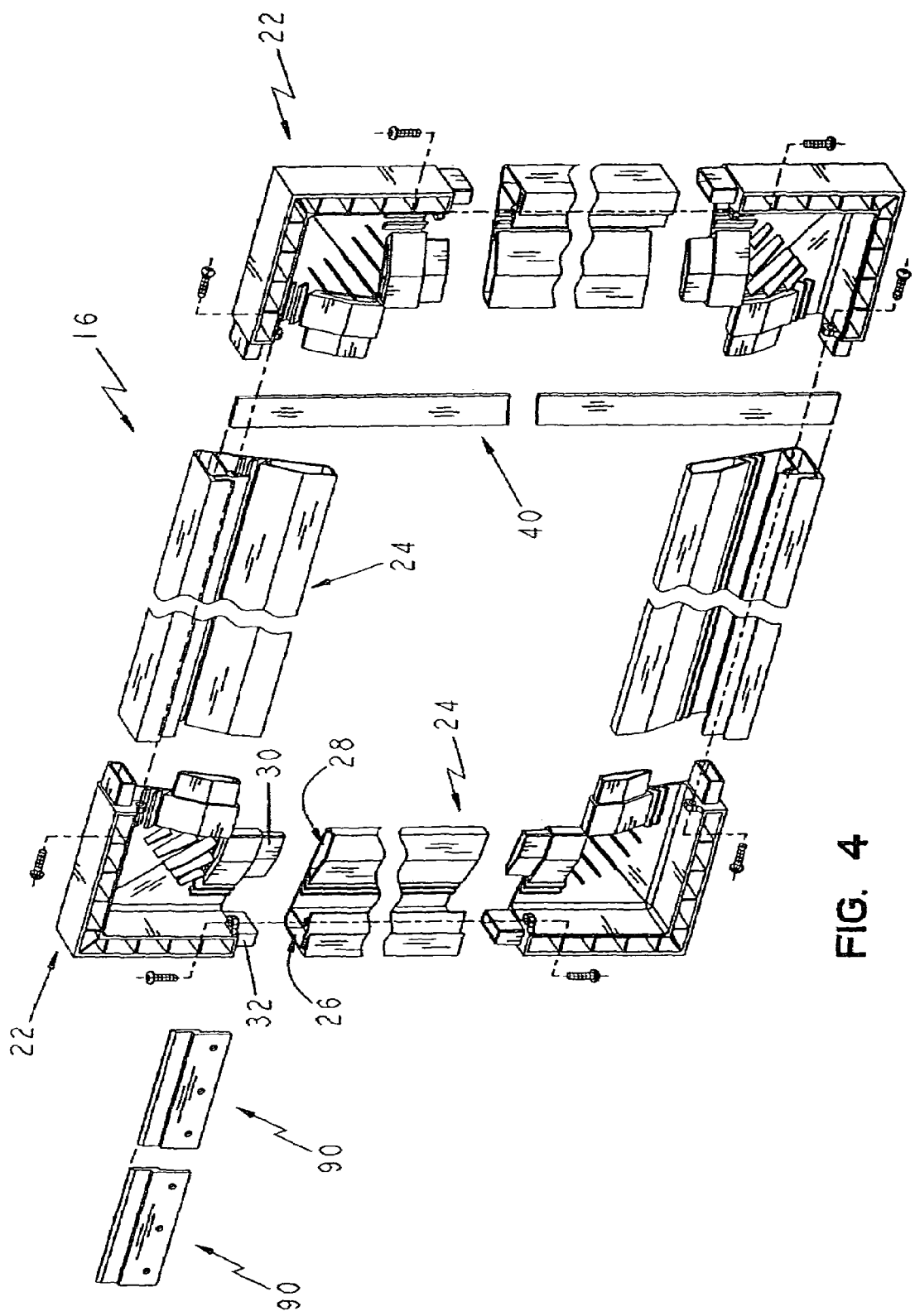
FIG. 4 is another exploded perspective view of the frame of the projection screen apparatus of FIG. 1.
Figure 8:
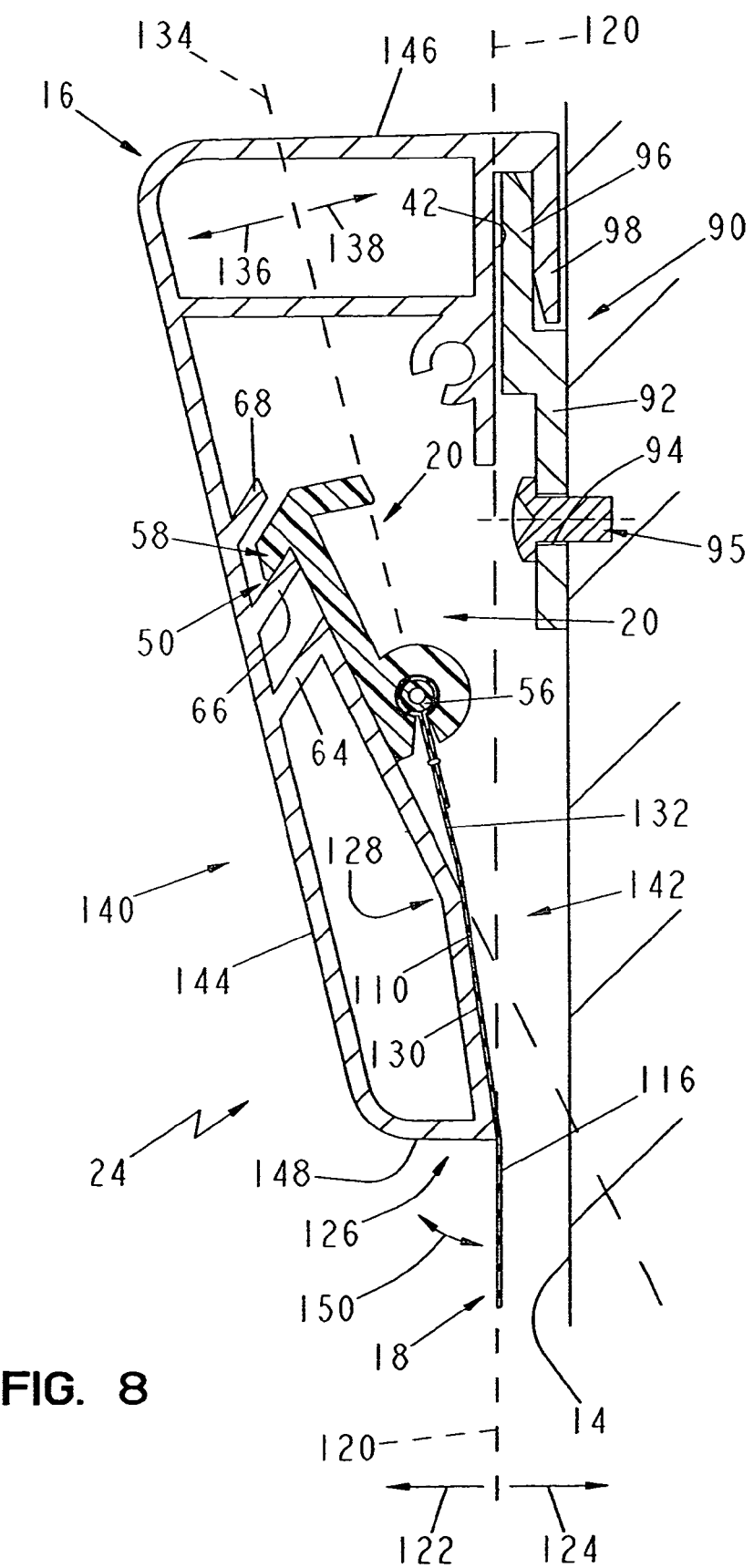
FIG. 8 is a cross-sectional view taken along line 8—8 of FIG. 1 showing the coupler in a second location relative to the frame member.
Figure 9:
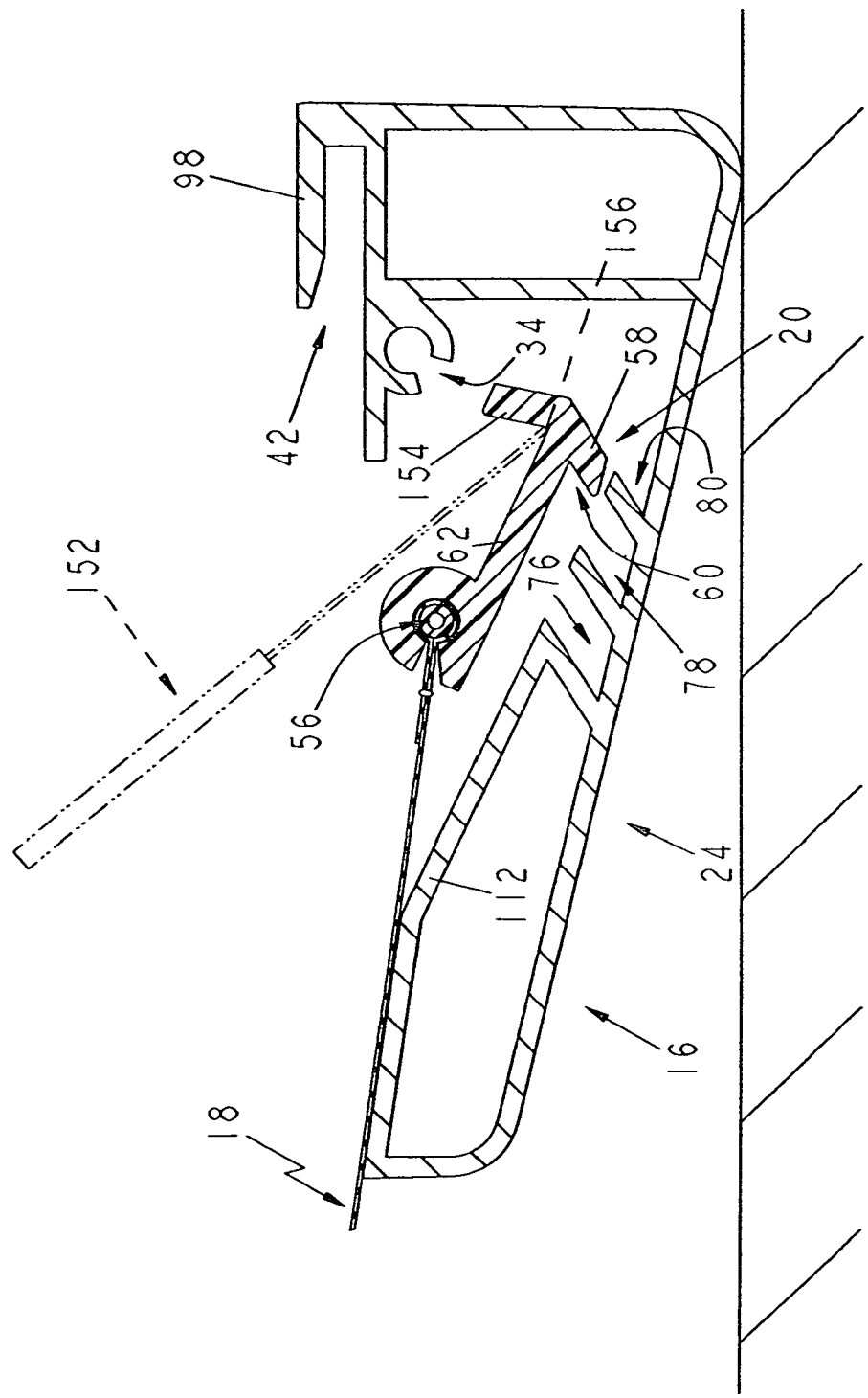
FIG. 9 is a view similar to FIG. 8 showing the coupler being moved to a third position when a user pushes on the coupler with a tool (in phantom)

After screen 18 is coupled to frame 16, frame 16 is mounted to wall 14. As shown in FIGS. 3, 4, and 8, projection screen apparatus 10 includes a pair of wall couplers 90 that are coupled to wall 14 and frame 16 to support perimeter frame 16 on wall 14. Wall coupler 90 is made of extruded aluminum and includes a first flange 92 including a plurality of fastener-receiving apertures 94 and a second flange 96.

During installation, one or more wall couplers 90 are coupled to wall 14 with second flange 96 extending upwardly. Preferably, wall couplers 90 are positioned at the same level so that perimeter frame 16 will be level and then fasteners 95, such as screws, are inserted through apertures 94 into wall 14. Second flange 96 and a flange 98 of frame members 24 defines channel 40 each have a ramped edge that facilitates insertion of flange 98 over second flange 96. As flange 98 of frame member 24 slides down flange 96 of wall coupler 90, frame 16 is drawn closer to wall 14. If necessary to center frame 16, frame 16 can be slid right or left on wall couplers 90 to a centered position without having to remove frame 16 from wall 14. To remove frame 16 for adjustment of the tension in screen 18 or otherwise, frame 16 is raised up and removed from wall 14.

FIGS. 7 and 8 illustrate screen 18 coupled to frame 16. Preferably, frame member 24 has a width 100 that is 4 inches wide. These figures and the others are proportional. Thus, one of ordinary skill in the art can derive dimensions for the other components from the figures based on the known width 100 of frame 24. According to alternative embodiments other widths are provided, such as 2, 3, or 5 inches.

When coupled to frame 16, perimeter portions 110 of screen 18 overlap respective walls 112 of frame members 24 and corresponding walls 114 of corner members 22. A substantially flat display portion 116 of screen 18 is surrounded by perimeter portions 110 and provides a display surface 118 on one side of display portion 116 on which images projected on screen 18 by projector 12 (either front or rear projection) are viewed by the audience seated in front of projection screen apparatus 10. Display surface 118 defines a plane 120 that has a first audience side 122 and an opposite second side 124. As shown in FIG. 8, screen coupler 20 is positioned on audience side 122 of plane 120 and wall coupler 90 is positioned on opposite side 124.

Wall 112 includes a first corner 126 on its inner edge that causes screen 18 to turn or bend and divides screen 18 into perimeter and display portions 110, 116 as shown in FIG. 8. Wall 112 also includes a second bend 128 that turns and divides perimeter portion 110 of screen 18 into first and second segments 130, 132. Corner 126 and bend 128 assist in suppressing puckering or creasing of screen caused by coupler 20 so that most, if not all, puckering or creasing is removed from screen 18 before reaching display portion 116 so that little or no distortion is caused in display surface 118.

Second segment 132 of perimeter portion 110 defines a plane 134 having a first side 136 and a second side 138. When screen 18 is coupled to frame 16, interactive member 50 of coupler 20 is positioned on first side 136 along with interactive members 64, 66, 68 of frame member 24 and interactive members 82, 84, 86 of corner members 22.

As shown in FIG. 8, frame 16 includes a front side 140 facing the audience and an opposite back side 142. Front side 140 is preferably painted or otherwise colored black and includes a face 144, an outer wall 146, and an inner side wall 148. When screen 18 is coupled to frame 16, display portion 116 of screen 18 defines an angle 150 of 91° to suppress images from "washing" onto face 144. Furthermore, face 144 and inner side wall 148 have a relatively large radius of 0.25 inches therebetween that further suppresses washing.

In a typical installation, frame 16 is first assembled as described above. Screen 18 and screen couplers 20 are coupled together as described above either before or after frame 16 is assembled. Screen 18 is then coupled to frame 16 with screen couplers 20. A tool 152, such as a plastic putty knife, is provided to assist in coupling couplers 20 to frame 16. Each coupler 20 includes a rib 154 positioned opposite rib 58 that is configured to receive a front edge 156 of tool 152.

Initially, screen coupler 20 is positioned adjacent to wall 112 of the respective frame member 24. By pressing on rib 154 with tool 152, rib 58 is forced along wall 112 until it snaps into one of grooves 76, 78, 80. When one end of rib 58 is positioned in groove 76, tool 152 is slid along the length of coupler 20 forcing the entire length of rib 58 into groove 76. Preferably, screen 18 is sized so that when ribs 58 of couplers 20 are positioned in first grooves 76, screen 18 is properly tensioned so that display portion 116 of screen 18 is properly tensioned and substantially flat. Depending on factors, such as manufacturing tolerances, temperature, or humidity, one or more of ribs 58 of couplers 20 may need to be moved further outward to second or third grooves 78, 80 to obtain the proper tension.

After a period time passes from the initial installation, screen 18 may stretch and develop a sag that noticeably distorts the quality of the images displayed on screen 18. To remove this sag, one or more couplers 20 is moved further out to the next respective groove 78, 80 until the sag in screen 18 is removed. Because couplers 20 an inaccessible from the front of projection screen apparatus 10, it must first be removed from wall 14 before the adjustment can be made.

Figure 10:
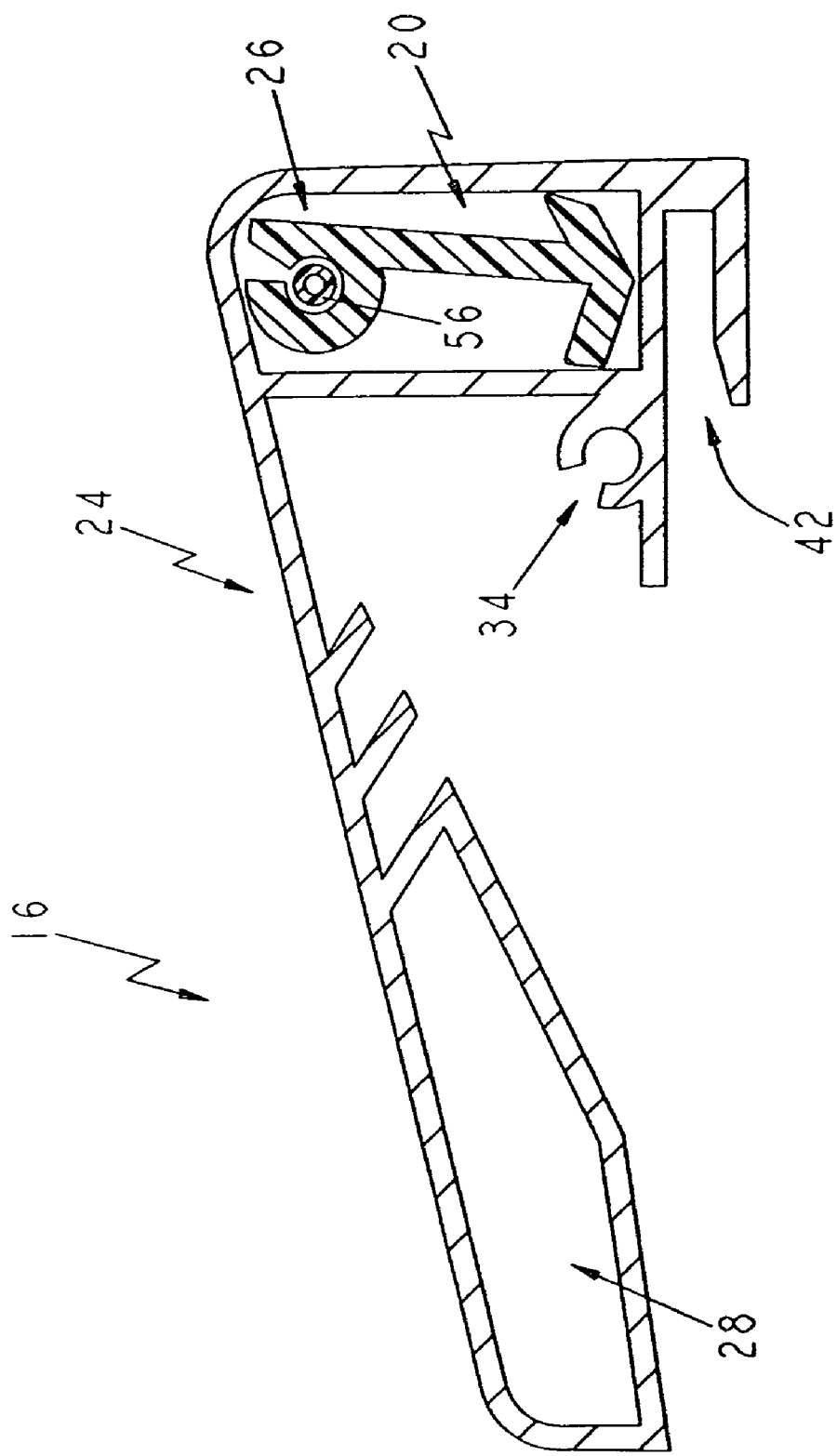
FIG. 10 is a cross-sectional view of the frame member and coupler showing the coupler positioned within a channel of the frame member for shipping.

As shown in FIG. 10, channel 26 is sized to receive coupler 26 and rod 56. Before shipping, coupler 26 and rod 56 are placed in channel 26. This help avoids damage to coupler 26 and rod 56 during shipping and also reduces the shipping space required.

Preferably, instructions for the assembly, installation, and/or use of projection screen apparatus 10 are provided with projection screen apparatus 10 or otherwise communicated to permit a person or machine to assemble, install and/or use projection screen apparatus 10. Such instructions may include a description of any or all portions of projection screen apparatus 10 and/or any or all of the above-described assembly, installation, and use of projection screen apparatus 10 or components of projection screen apparatus 10. The instructions may be provided on separate papers and/or on the packaging in which projection screen apparatus 10 is sold or shipped. These instructions may also be provided over the Internet or other communication system. Furthermore, the instructions may be embodied as text, pictures, audio, video, or any other medium or method of communicating instructions known to those of ordinary skill in the art.

Although the present invention has been described in detail with reference to preferred embodiments, variations and modifications exist within the scope and spirit of the present invention as described and defined in the following claims.

The invention claimed is:

1. A projection screen apparatus comprising
a perimeter frame,
a screen tensioned on the perimeter frame, the screen having a substantially flat, blank display portion and a perimeter portion coupled to the display portion and the perimeter frame, the perimeter portion having a width and a length, the length extending in a first linear direction, and
a screen coupler configured to couple the screen to the perimeter frame, the screen coupler extending in the first linear direction and including an end coupled to the perimeter portion of the screen and an interactive member moveable from a first position coupled to the perimeter frame to a second position coupled to the perimeter frame to increase the tension in the display portion of the screen, the end of the coupler being positioned between the interactive member of the coupler and the perimeter portion of the screen.

2. The projection screen apparatus of claim 1, wherein the projection screen overlaps a wall of the perimeter frame and the interactive member of the coupler extends toward the wall of the perimeter frame.

3. The projection screen apparatus of claim 1, wherein at least one of the interactive member of the coupler and the perimeter frame defines an undercut groove configured to draw the interactive member of the coupler toward the perimeter frame as tension is applied to the projection screen.

4. The projection screen apparatus of claim 1, wherein the interactive member of the coupler extends toward the display portion of the projection screen.

5. The projection screen apparatus of claim 1, wherein the perimeter frame includes a plurality of corner members and a plurality of frame members extending between the corner members, the corner members have width, the frame members have a width substantially equal to the width of the corner members, the plurality of frame members and the plurality of corner members cooperate to define a junction having at least one aperture and at least one post positioned in the channel.

6. The projection screen apparatus of claim 5, wherein the plurality of corner members include at least one post.

7. The projection screen apparatus of claim 5, wherein the plurality of frame members include at least one aperture.

8. The projection screen apparatus of claim 5, wherein the junction further comprises at least one fastener positioned to block movement of the post relative to the aperture.

9. The projection screen apparatus of claim 5, wherein the plurality of frame members are substantially longer than the plurality of corner members.

10. The projection screen apparatus of claim 5, wherein the junction includes a pair of apertures configured to receive a pair of posts.

11. A projection screen apparatus comprising
a perimeter frame having a plurality of frame members,
a projection screen having a substantially blank viewable portion tensioned on the perimeter frame and a plurality of perimeter portions, at least one perimeter portion overlapping a plurality of frame members of the perimeter frame, and
a plurality of screen couplers configured to couple the perimeter portions of the screen to the frame members of the perimeter frame, the screen couplers including an interactive member moveable from a first position on the frame member of the perimeter frame providing a first amount of tension in the projection screen to a second position on the frame member of the perimeter frame providing a second amount of tension in the projection screen that is greater than the first amount of tension in the projection screen.

12. The projection screen apparatus of claim 11, wherein the perimeter portion overlapping the wall of the perimeter frame defines a plane having a first side and an opposite second side, the wall of the perimeter frame overlapped by the perimeter portion of the projection screen and the interactive member of the coupler are positioned on the first side of the plane.

13. The projection screen apparatus of claim 11, wherein the wall overlapped by the perimeter portion of the projection screen and coupled with the interactive member of the screen coupler is substantially straight.

14. The projection screen apparatus of claim 11, wherein the perimeter frame includes a notch sized to receive the interactive member of the coupler and the notch opens away from the projection screen.

15. The projection screen apparatus of claim 11, wherein the screen couplers have a first end and a second end, the second end includes an open channel and a rod positioned in the loop and the open channel to retain the loop in the open channel.

16. The projection screen apparatus of claim 15, wherein the edge portion is folded over and sewn to create the loop.

17. The projection screen apparatus of claim 15, wherein the rod is longer than the screen coupler.

18. The projection screen apparatus of claim 15, wherein the rod is hollow.

19. The projection screen apparatus of claim 15, wherein the first end includes the interactive member.

20. A projection screen apparatus for use with a projector configured to project an image to be watched by a viewer, the projection screen apparatus comprising
a perimeter frame,
a projection screen including a substantially blank front display surface positioned to face toward a viewer of a projected image, the display surface defining a plane having a first display side and a second side opposite the first side, and
a coupler positioned on the first display side of the plane to couple the projection screen to the perimeter frame, the coupler including an interactive member configured to couple with the perimeter frame, the interactive member of the coupler being movable from a first position coupled to the perimeter frame to a second position coupled to the perimeter frame to increase the tension in the screen.

21. The projection screen apparatus of claim 20, further comprising a wall support coupler coupled to the perimeter frame and adapted to support the perimeter frame on a wall of a structure, wherein the wall support coupler is positioned on the second side of the plane.

22. The projection screen apparatus of claim 20, wherein the perimeter frame includes a front side facing a viewer and a back side facing away from the viewer, the front side is positioned on the first display side of the plane.

23. The projection screen apparatus of claim 22, wherein the front side is substantially black.

24. The projection screen apparatus of claim 20, wherein the perimeter frame includes a front face and an inner wall positioned an intersection of the substantially blank front display surface of the projection screen and the perimeter frame, the inner wall and the substantially blank front display surface of the projection screen cooperate to define an angle greater than 90° to prevent creep of the projected image onto the front face of the perimeter frame.

25. The projection screen apparatus of claim 20, wherein the perimeter frame includes a plurality of corner members defining at least a portion of the frame and a plurality of frame members extending between the corner members, the corner members cooperate with the frame members to define a perimeter of the frame.

26. The projection screen apparatus of claim 25, wherein the corner members include a first junction, a second junction and a bevel portion positioned between the first and second junctions.

27. The projection screen apparatus of claim 25, wherein the corner members and the frame members cooperate to define an interior perimeter of the frame.

28. The projection screen apparatus of claim 27, wherein the screen contacts a portion of each of the plurality of corner members.

29. The projection screen apparatus of claim 25, wherein the plurality of frame members and the plurality of corner members cooperate to define a junction having at least one aperture and at least one post positioned in the aperture.

30. The projection screen apparatus of claim 29, wherein the coupler extends over the junction.

31. The projection screen apparatus of claim 20, wherein the coupler is extruded.

32. A projection screen apparatus comprising
a perimeter frame,
a screen tensioned on the perimeter frame, the screen having a substantially flat, blank display portion defining a plane and a perimeter portion coupled to the display portion and the perimeter frame, the perimeter portion extending in a first linear direction parallel to the plane defined by the display portion, and
a screen coupler extending in the first linear direction including an end coupled to the perimeter portion of the screen and an interactive member moveable from a first position coupled to the perimeter frame to a second position coupled to the perimeter frame to increase the tension in the display portion of the screen, the end of the coupler being positioned between the interactive member of the coupler and the perimeter portion of the screen.

33. The projection screen apparatus of claim 32, wherein at least one of the interactive member of the coupler and the perimeter frame defines an undercut groove configured to draw the interactive member of the coupler toward the perimeter frame as tension is applied to the projection screen.

34. The projection screen apparatus of claim 32, wherein at least one of the interactive member of the coupler and the perimeter frame defines an undercut groove configured to draw the interactive member of the coupler toward the perimeter frame as tension is applied to the projection screen.

35. A projection screen apparatus comprising
a perimeter frame,
a screen tensioned on the perimeter frame, the screen having a substantially flat, blank display portion and a perimeter portion coupled to the display portion and the perimeter frame, the perimeter portion extending in a first linear direction, and
a screen coupler extending in the first linear direction including an end coupled to the perimeter portion of the screen and an interactive member moveable from a first position coupled to the perimeter frame to a second position coupled to the perimeter frame to increase the tension in the display portion of the screen, movement from the first position to the second position being in a second linear direction, the first linear direction being different from the second linear direction, the end of the coupler being positioned between the interactive member of the coupler and the perimeter portion of the screen.

36. The projection screen apparatus of claim 35, wherein the projection screen overlaps a wall of the perimeter frame and the interactive member of the coupler extends toward the wall of the perimeter frame.

37. A projection screen apparatus comprising
a perimeter frame,
a screen tensioned on the perimeter frame, the screen having a substantially flat, blank display portion and a perimeter portion coupled to the display portion and the perimeter frame, the perimeter portion extending in a first linear direction, and
means for coupling the screen to the perimeter frame, the screen coupling means being moveable from a first position coupled to the perimeter frame to a second position coupled to the perimeter frame to increase the tension in the display portion of the screen.

38. The projection screen apparatus of claim 37, wherein the screen coupling means extends in the first linear direction and includes an end coupled to the perimeter portion of the screen and an interactive member, the end of the coupling means is positioned between the interactive member of the coupling means and the perimeter portion of the screen and at least one of the interactive member of the coupler and the perimeter frame defines an undercut groove configured to draw the interactive member of the coupler toward the perimeter frame as tension is applied to the projection screen.

39. A projection screen apparatus comprising
a perimeter frame having a plurality of frame members,
a projection screen having a substantially blank viewable portion tensioned on the perimeter frame and a plurality of perimeter portions each overlapping a plurality of frame members of the perimeter frame, and
a plurality of screen couplers, each including an interactive member moveable from a first position on the frame member of the perimeter frame providing a first amount of tension in the projection screen to a second position on the frame member of the perimeter frame providing a second amount of tension in the projection screen that is greater than the first amount of tension in the projection screen.

40. The projection screen apparatus of claim 39, wherein the plurality of perimeter portions overlapping the wall of the perimeter frame define a plane having a first side and an opposite second side, the wall of the perimeter frame overlapped by the perimeter portion of the projection screen and the interactive member of the coupler are positioned on the first side of the plane.

\* \* \* \* \*